(12) United States Patent
Shiroor et al.

(10) Patent No.: US 10,139,989 B2
(45) Date of Patent: Nov. 27, 2018

(54) MAPPING VISUALIZATION CONTEXTS

(71) Applicants: Kedar Shiroor, Mountain View, CA (US); Scott Cronin, San Francisco, CA (US)

(72) Inventors: Kedar Shiroor, Mountain View, CA (US); Scott Cronin, San Francisco, CA (US)

(73) Assignee: SAP SE, Walldorf (DE)

( * ) Notice: Subject to any disclaimer, the term of this patent is extended or adjusted under 35 U.S.C. 154(b) by 915 days.

(21) Appl. No.: 14/106,475

(22) Filed: Dec. 13, 2013

(65) Prior Publication Data

US 2015/0169057 A1 Jun. 18, 2015

(51) Int. Cl.
*G06F 3/0482* (2013.01)
*G06F 3/0488* (2013.01)

(52) U.S. Cl.
CPC ........ *G06F 3/0482* (2013.01); *G06F 3/04883* (2013.01); *G06F 3/04886* (2013.01)

(58) Field of Classification Search
CPC . G06F 3/0482; G06F 3/04883; G06F 3/04886
See application file for complete search history.

(56) References Cited

U.S. PATENT DOCUMENTS

| | | | |
|---|---|---|---|
| 6,320,586 B1 | 11/2001 | Plattner et al. | |
| 7,027,052 B1 | 4/2006 | Thorn et al. | |
| 7,378,969 B2 | 5/2008 | Chan et al. | |
| 7,933,632 B2 | 4/2011 | Flynt et al. | |
| 8,260,658 B2 | 9/2012 | Fenstermaker et al. | |
| 2002/0027549 A1* | 3/2002 | Hirshberg | G06F 3/0234 345/168 |
| 2006/0022981 A1* | 2/2006 | Ben-Tovim | G06T 11/206 345/440 |
| 2006/0262145 A1* | 11/2006 | Zhang | G06Q 10/10 345/661 |
| 2007/0082707 A1* | 4/2007 | Flynt | G06F 3/0481 455/564 |
| 2008/0086703 A1* | 4/2008 | Flynt | G06F 3/0482 715/853 |
| 2010/0302212 A1* | 12/2010 | Weber | G06F 3/0488 345/178 |
| 2012/0174025 A1 | 6/2012 | SanGiovanni et al. | |
| 2012/0303548 A1 | 11/2012 | Johnson et al. | |
| 2013/0050217 A1 | 2/2013 | Armitage | |
| 2013/0067412 A1 | 3/2013 | Leonard et al. | |
| 2013/0275527 A1 | 10/2013 | Deurloo | |
| 2013/0275904 A1 | 10/2013 | Bhaskaran et al. | |
| 2013/0321458 A1 | 12/2013 | Miserendino et al. | |
| 2014/0028730 A1 | 1/2014 | Abdukalykov et al. | |
| 2014/0164963 A1 | 6/2014 | Klemenz et al. | |
| 2014/0218394 A1* | 8/2014 | Hochmuth | G09G 5/377 345/629 |
| 2014/0229901 A1 | 8/2014 | Chand et al. | |

\* cited by examiner

*Primary Examiner* — Justin R. Blaufeld
(74) *Attorney, Agent, or Firm* — Brake Hughes Bellermann LLP

(57) ABSTRACT

In accordance with aspects of the disclosure, systems and methods are provided for displaying user interactive regions having corresponding tap sensitive targets for each of a plurality of scalable values representing a visualization context associated with each user interactive region while maintaining a size of each user interactive region and each corresponding tap sensitive target according to each scalable value associated therewith.

17 Claims, 13 Drawing Sheets

MAPPING VISUALIZATION CONTEXTS

TECHNICAL FIELD

The present description relates to various computer-based techniques for mapping visualization contexts.

BACKGROUND

In typical computing environments, treemaps consist of a large number of rectangles tiled together, where each rectangle depicts a quantifiable value in comparison to other rectangles. Generally, the rectangles are sized relative to each other based on the quantifiable measure, and a user may interact with rectangles using a mouse. However, with touch type devices, user interaction may be restricted/constricted because finger tapping an individual rectangle may be inaccurate, cumbersome and difficult when rectangles are smaller than a user's finger size. As such, there exists a need to improve user interaction with treemaps displayed on touch type devices.

SUMMARY

In accordance with aspects of the disclosure, a computer system may be provided for mapping visualization contexts including instructions stored on a computer-readable medium and executable by at least one processor. The computer system may include a computing device, such as, e.g., a mobile communication device, having at least one processor, display, and memory. The computer system may include a visualization mapper configured to cause the at least one processor to display a plurality of user interactive regions having corresponding tap sensitive targets for each of a plurality of scalable values representing a visualization context associated with each user interactive region while maintaining a size of each user interactive region and each corresponding tap sensitive target according to each scalable value associated therewith. The visualization mapper may include an algorithm handler configured to cause the at least one processor to selectively scale the size of each user interactive region and each corresponding tap sensitive target according to each scalable value associated therewith. The visualization mapper may include a grouping handler configured to cause the at least one processor to group one or more of the user interactive regions that are dimensionally smaller than a tap target size predefined for each tap sensitive target into a specified user interactive region that is expandable upon selection thereof via tactile gesture by a user. The visualization mapper may include a display handler configured to cause the at least one processor to display each of the user interactive regions along with the specified user interactive region according to each scalable value associated therewith.

In accordance with aspects of the disclosure, a computer program product may be provided for mapping visualization contexts. The computer program product may be tangibly embodied on a non-transitory computer-readable storage medium and includes instructions that, when executed by at least one processor, may be configured to display a plurality of user interactive regions having corresponding tap sensitive targets for each of a plurality of scalable values representing a visualization context associated with each user interactive region while maintaining a size of each user interactive region and each corresponding tap sensitive target according to each scalable value associated therewith. The instructions, when executed by the at least one processor, may be further configured to selectively scale the size of each user interactive region and each corresponding tap sensitive target according to each scalable value associated therewith. The instructions, when executed by the at least one processor, may be further configured to group one or more of the user interactive regions that are dimensionally smaller than a tap target size predefined for each tap sensitive target into a specified user interactive region that is expandable upon selection thereof via tactile gesture by a user. The instructions, when executed by the at least one processor, may be further configured to display each of the user interactive regions along with the specified user interactive region according to each scalable value associated therewith.

In accordance with aspects of the disclosure, a computer-implemented method may be provided for mapping visualization contexts. The computer-implemented method may include displaying a plurality of user interactive regions having corresponding tap sensitive targets for each of a plurality of scalable values representing a visualization context associated with each user interactive region while maintaining a size of each user interactive region and each corresponding tap sensitive target according to each scalable value associated therewith. The computer-implemented method may include selectively scaling the size of each user interactive region and each corresponding tap sensitive target according to each scalable value associated therewith. The computer-implemented method may include grouping one or more of the user interactive regions that are dimensionally smaller than a tap target size predefined for each tap sensitive target into a specified user interactive region that is expandable upon selection thereof via tactile gesture by a user. The computer-implemented method may include displaying each of the user interactive regions along with the specified user interactive region according to each scalable value associated therewith.

The details of one or more implementations are set forth in the accompanying drawings and the description below. Other features will be apparent from the description and drawings, and from the claims.

DETAILED DESCRIPTION

Figure 1:
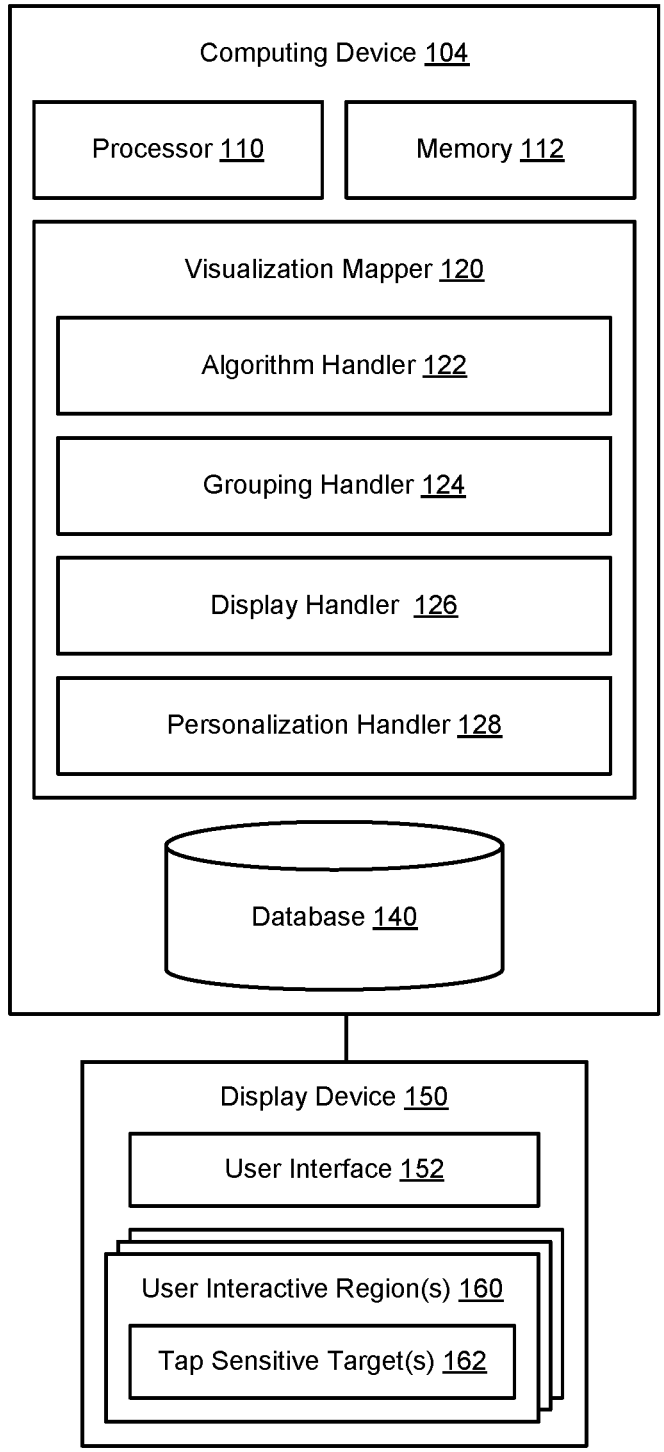
FIG. 1 is a block diagram illustrating an example system for mapping visualization contexts, in accordance with aspects of the disclosure.

FIG. 1 is a block diagram illustrating an example system 100 for mapping visualization contexts, in accordance with aspects of the disclosure.

In the example of FIG. 1, the system 100 comprises a computer system for implementing visualization context mapping that may be associated with a computing device 104 (e.g., mobile computing device), thereby transforming the computing device 104 into a special purpose machine designed to implement visualization context mapping process(es), as described herein. In this instance, the computing device 104 may include any standard element(s) and/or component(s), including at least one processor(s) 110, memory 112 (e.g., non-transitory computer-readable storage medium), database(s) 140, power, peripherals, and various other computing elements and/or components that may not be specifically shown in FIG. 1. Further, the system 100 may be associated with a display device 150 (e.g., a monitor or other display) that may be used to provide a user interface (UI) 152, such as, in some examples, a graphical user interface (GUI). In some examples, the display 150 includes a touch screen display. In some examples, the UI 152 may be used to receive preferences from a user for managing or utilizing the system 100. As such, various other element(s) and/or component(s) of the system 100 that may be useful for purpose of implementing the system 100 may be added or included, as would be apparent to one of ordinary skill in the art.

In the example of FIG. 1, the visualization context mapping system 100 may include the computing device 104 and instructions recorded or stored on the non-transitory computer-readable medium 112 and executable by the at least one processor 110. In some examples, the visualization context mapping system 100 may include the display device 150 for providing/displaying output to a user, and the display device 150 may include the UI 152 for receiving input from the user. In some examples, the output may include displaying one or more user interactive regions, sections, or areas 160 with each user interactive region 160 including at least one tap sensitive target 162, which may include a region, section, or area associated therewith.

In an implementation, the example system 100 for mapping visualization contexts may include a system and related methods for optimizing display of hierarchical data using nested geographical regions including, for example, a treemap. For instance, various visualization context maps may be utilized to organize various types of data and information, including data and information related to one or more users. Accordingly, aspects of the disclosure relate to organization and interaction techniques for interacting with visualization context maps on the display 150, such as, e.g., a touch screen device.

In various implementations, visualization context maps may include any number of user interactive regions, such as, e.g., a large number of geometric shapes (e.g., rectangular shapes) arranged and/or positioned together to fill an available display area of the display 150 to define an overall geometric region on the display 150, such as, e.g., one large geometric shape (e.g., rectangular shape). Each region may be configured to depict a quantifiable value in comparison to other regions. Each region may be sized relative to each other region based on the quantifiable value or measure. Visualization context maps may include a large number of such regions that are interactive via a tap sensitive display or touch sensitive display.

As such, aspects of the disclosure provide techniques on grouping regions that are smaller than a predefined tap size into at least one region, such as, e.g., one geometric shape (e.g., rectangular shape) labeled in reference thereof. In some examples, this at least one region may be labeled "more" or "other", and a user may tap or select the "more" or "other" labeled region to expand the display to further display one or more additional regions for viewing thereof and/or interaction therewith. Further, aspects of the disclosure provide for viewing these additional regions in a list view, e.g., if the user does not desire to navigate to the "more" or "other" expandable section. Theses and other aspects of the disclosure are described in greater detail herein.

In various implementations, aspects of the disclosure provide techniques that allow users to interact with each individual region without having to struggle with approximate taps on a touch surface of the display 150. Further, aspects of the disclosure provide techniques that allows users to view regions in a list view.

In accordance with aspects of the disclosure, the example system 100 and methods related thereto may be configured to optimize display of visualization context maps. In various examples, the example system 100 and methods related thereto may be configured to display the one or more user interactive regions 160 having corresponding tap sensitive targets 162 while maintaining a size of each user interactive region 160 and each corresponding tap sensitive target 162. The user interactive regions 160 may refer to a section or area associated therewith, and the tap sensitive targets 162 may refer to a region, section, or area associated therewith. These and various other aspects of the disclosure are described in greater detail herein.

In the example of FIG. 1, the visualization context mapping system 100 may include a visualization mapper 120 configured to cause the at least one processor 110 to display one or more of the plurality of user interactive regions 160 having the corresponding tap sensitive targets 162 for each of a plurality of scalable values that may be configured to represent a visualization context associated with each user interactive region 160 while maintaining a size of each user interactive region 160 and each corresponding tap sensitive target 162 according to each scalable value associated therewith. In some examples, the visualization context may refer to one or more attributes, circumstances, settings, parameters, and/or values associated with an event and/or an occurring event, which may include data and/or information associated therewith. In some other examples, the visualization context may refer to one or more values of text and/or textual statement(s) attributed to a specific word, phrase, and/or passage to thereby determines its meaning.

In various implementations, each of the user interactive regions 160 and each corresponding tap sensitive target 162 may be configured to occupy a same partitioned area or region on the display 150. In some examples, each of the plurality of scalable values may be configured to represent a predefined property associated with data and/or information related to, e.g., the user.

In various implementations, each visualization context may be configured to represent each corresponding scalable value as scale of the associated user interactive region 160 and/or the corresponding tap sensitive target 162. In some examples, each visualization context may be configured to represent each corresponding scalable value as a textual property for text in each associated user interactive region 160 including at least one of font size of the text, font type of the text, and font color of the text. Further, in some other examples, each visualization context may be configured to represent each corresponding scalable value as a regional property for each associated user interactive region 160 including at least one of orientation for each associated user interactive region 160, outline shape for each associated user interactive region 160, outline color for each associated user interactive region 160, and background color for each associated user interactive region 160.

In the example of FIG. 1, the visualization mapper 120 may include an algorithm handler 122 configured to cause the at least one processor 110 to selectively scale the size of each user interactive region 160 and each corresponding tap sensitive target 162 according to each scalable value associated therewith. For instance, in some implementations, the algorithm handler 122 may be configured to cause the at least one processor 110 to measure available display area of a display, such as, e.g., the display device 150. Further, in some examples, the algorithm handler 122 may be configured to partition the available display area of a display, such as, e.g., the display device 150, into the plurality of user interactive regions 160, with each having a tap sensitive target 162.

In the example of FIG. 1, the visualization mapper 120 may include a grouping handler 124 configured to cause the at least one processor 110 to group one or more of the user interactive regions 160 that are dimensionally smaller than a tap target size predefined for each tap sensitive target 162 into a specified user interactive region 160 that is expandable upon selection thereof via tactile gesture, e.g., by a user.

In various implementations, the tap target size of each tap sensitive target 162 may include a block of pixels having predefined dimensions. In some examples, the predefined dimensions may include a two-dimensional geographical region having, e.g., a length measured in pixels and a width measured in pixels. In various examples, the pixel length may include any dimensional length of pixels measured along a side of the tap sensitive target region, and the pixel width may include any dimensional width of pixels measured along another side of the tap sensitive target region. For instance, dimensions of the tap sensitive target region may include 45 pixels by 45 pixels.

In the example of FIG. 1, the visualization mapper 120 may include a display handler 126 configured to cause the at least one processor 110 to display each of the user interactive regions 160 along with the specified user interactive region 160 according to each scalable value associated therewith. For instance, in some examples, the display handler 126 may be configured to cause the at least one processor 110 to display an expanded region having one or more additional user interactive regions 160 along with at least one other specified user interactive region 160 that is expandable upon selection thereof via tactile gesture, e.g., by the user.

In the example of FIG. 1, the visualization mapper 120 may include a personalization handler 128 configured to cause the at least one processor 110 to selectively scale the size of each tap sensitive target 162 according to a user tactile input via tactile gesture, e.g., by the user. For instance, in some examples, the personalization handler 128 may be configured to cause the at least one processor 110 to selectively personalize the tap target size, which may be measurable by positioning a user's preferred tap finger on the display 150 for detection or auto-detection of a personalized preference and tap target size for the tap sensitive targets 162.

In some examples, the personalization handler 128 may be configured to cause the at least one processor 110 to allow a user to enter/input a number of entities to be visualized in the display with the visualization context map. Further, in some examples, the personalization handler 128 may be configured to cause the at least one processor 110 to enter/input minimum and maximum values/thresholds for relative sizing and color definition of the user interactive regions 160 and/or tap sensitive targets 162 to depict secondary dimension values/properties (e.g., green may used to represent a good visualization context, red may used to represent a bad visualization context, yellow may used to represent a cautionary visualization context, etc.).

In an implementation, the visualization context mapping system 100 may include one or more databases 140 configured to store various information related to mapping visualization contexts. For instance, the database(s) 140 may be configured to store information related to each of the plurality of user interactive region 160 and each corresponding tap sensitive target 162.

In the example of FIG. 1, it should be appreciated that the visualization context mapping system 100 is illustrated using various functional blocks or modules that represent more-or-less discrete functionality. However, such illustration is provided for clarity and convenience, and thus, the various functionalities may overlap or be combined within a described block(s) or module(s), and/or may be implemented by one or more block(s) or module(s) not specifically illustrated in the example of FIG. 1. Therefore, conventional functionality that may be considered useful to the system 100 of FIG. 1 may be included as well even though such conventional elements are not illustrated explicitly, for the sake of clarity and convenience.

Figure 2A:
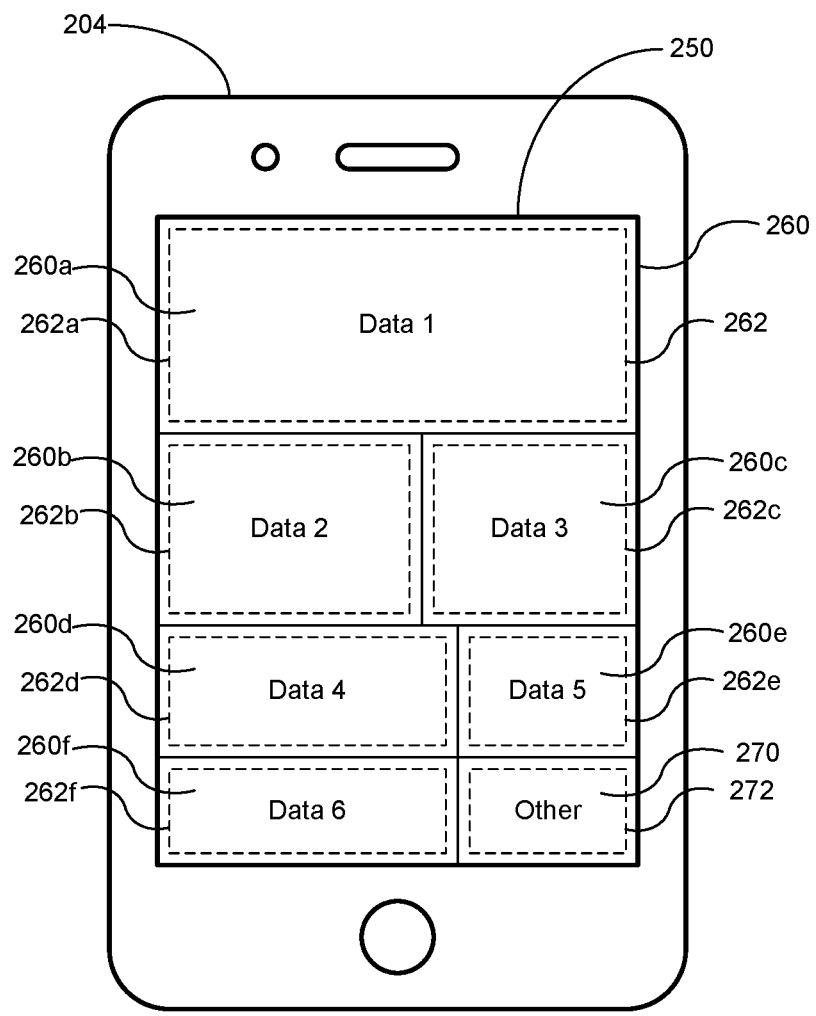
FIGS. 2A-2B are block diagrams illustrating example systems for mapping visualization contexts, in accordance with aspects of the disclosure.
Figure 2B:
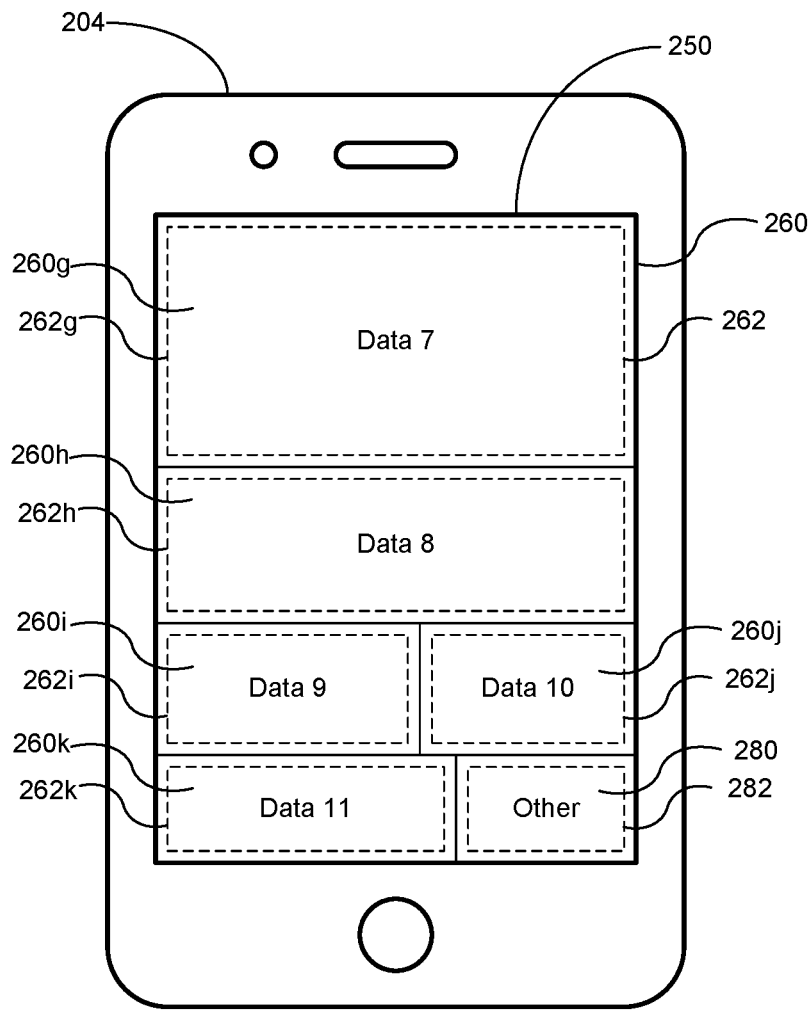

FIGS. 2A-2B are block diagrams illustrating example systems 200, 202 for mapping visualization contexts, in accordance with aspects of the disclosure. In particular, FIG. 2A is a block diagram illustrating an example system 200 for mapping a first plurality of visualization contexts, and FIG. 2B is a block diagram illustrating another example system 200 for mapping a second plurality of visualization contexts, in accordance with aspects of the disclosure.

In the examples of FIGS. 2A-2B, the systems 200, 202 comprise computer systems for implementing visualization context mapping that may be associated with a computing device 204, such as, e.g., a mobile communication device, having at least one processor and memory. The computing device 204 may include at least one display 250 for displaying/mapping a plurality of user interactive regions 260 having corresponding tap sensitive targets 262 for each of a plurality of scalable values (e.g., Data 1, Data 2, . . . , Data N) that represent a visualization context associated with each user interactive region 260 while maintaining a size of each user interactive region 260 and each corresponding tap sensitive target 262 according to each scalable value associated therewith. The user interactive regions 260 may refer to a section or area associated therewith, and the tap sensitive targets 262 may refer to a region, section, or area associated therewith.

In some implementations, the computing device 204 may be configured to measure available display area of the display 250 and partition the available display area into the plurality of user interactive regions 260. Further, the computing device 204 may be configured to selectively scale a size of each user interactive region 260 and each corresponding tap sensitive target 262 according to each scalable value (e.g., Data 1, Data 2, . . . , Data N) associated therewith. In some examples, each of the plurality of scalable values may be configured to represent a predefined property and/or value associated with various types of data and information, including information related to a user. In some examples, each visualization context for each user interactive region 260 may be configured to represent each corresponding scalable value as scale (e.g., dimensional scale) of the associated user interactive region 260.

In some implementations, the visualization contexts of the user interactive regions 260 may be configured to display hierarchical data and information using nested geographical regions, such as, e.g., rectangular regions. For instance, as shown in the examples of FIGS. 2A-2B, various visualization context maps may be utilized to organize various types of data and information, including data and information related to one or more users, on the display 250, such as, e.g., a touch screen device.

In some implementations, the size of the user interactive regions 260 corresponds to a value of data assigned to each specific user interactive region 260, and the size of each user interactive region 260 may be scaled to reflect the assigned value of data for each specific user interactive region 260. For instance, as shown in FIG. 2A, a first user interactive region 260a is larger in size than a second user interactive region 260b, which are both larger in size (and value) than a third user interactive region 260c, and so on with forth 260d, fifth 260e, and sixth 260f user interactive regions. Therefore, the size of the user interactive regions 260 are organized with a hierarchical structure based on a value associated with each corresponding user interactive region 260, and the size of each user interactive region 260 may be scaled to reflect the assigned value of data for each specific user interactive region 260.

In some implementations, if a value associated with one or more of the user interactive regions 260 changes or is modified, then the size of the changed or modified user interactive regions 260 changes or is modified accordingly to reflect the changed or modified value associated therewith. For instance, in an example, if a value for Data 1 associated with the first user interactive region 260a increases, then the size of the first user interactive region 260a increases accordingly to reflect the increased value associated therewith. In another example, if a value for Data 3 associated with the third user interactive region 260c decreases, then the size of the third user interactive region 260c decreases accordingly to reflect the decreased value associated therewith.

In some implementations, the position of the changed or modified user interactive region 260 may be moved to accommodate the changed or modified value associated therewith. For instance, in an example, if a value for Data 4 associated with the forth user interactive region 260d increases to a value greater than a value for Data 1 associated with the first user interactive region 260a, then the size of the forth user interactive region 260d increases accordingly to reflect the decreased value associated therewith and is repositioned to a position above the first user interactive region 260a. In another example, if a value for Data 2 associated with the second user interactive region 260b increases to a value less than a value for Data 5 associated with the fifth user interactive region 260e, then the size of the second user interactive region 260b decreases accordingly to reflect the decreased value associated therewith and is repositioned to a position below the fifth user interactive region 260e.

Accordingly, as described herein, each of the plurality of scalable values associated with each corresponding user interactive regions 260 represents a predefined property and/or value associated with various types of data and/or information, including information related to a user. Further, each visualization context associated with each corresponding user interactive regions 260 represents each corresponding scalable value as scale (e.g., dimensional scale) of the associated user interactive region 260. In some examples, each visualization context may represent each corresponding scalable value as a textual property for text in each associated user interactive region including at least one of font size of the text, font type of the text, and font color of the text. In some other examples, each visualization context may represent each corresponding scalable value as a regional property for each associated user interactive region 260 including at least one of orientation for each associated user interactive region 260, outline shape for each associated user interactive region 260, outline color for each associated user interactive region 260, and background color for each associated user interactive region 260.

In various implementations, the size of each user interactive region 260 may include a block of pixels having various predefined dimensions. In some examples, the predefined dimensions may include a two-dimensional (2D) geographical region having, e.g., a length measured in pixels and a width measured in pixels. In various examples, the pixel length may include any dimensional length of pixels measured along a side of the user interactive region 260, and the pixel width may include any dimensional width of pixels measured along another side of the user interactive region 260.

In some implementations, each of the user interactive regions 260 include corresponding tap sensitive targets 262. In some examples, each of the user interactive regions 260 and each corresponding tap sensitive target 262 may be configured to occupy a same partitioned area, section, or region on the display 250.

In some implementations, the size of each tap sensitive target 262 may correspond to the size of its corresponding user interactive region 260. For instance, in an example, the size of a first tap sensitive target 262a may correspond to the size of the first user interactive region 260, the size of a second tap sensitive target 262b may correspond to the size of the second user interactive region 260b, etc.

In some implementations, the size of each tap sensitive target 262 may correspond to a value of data assigned to each user interactive region 260 and/or specific tap sensitive target 262, and the size of each tap sensitive target 262 may be scaled to reflect the assigned value of data for each user interactive region 260 and/or each specific tap sensitive target 262. For instance, as shown in FIG. 2A, the first tap sensitive target 262a is larger in size than a second tap sensitive target 262b, which are both larger in size (and value) than a third tap sensitive target 262c, and so on with forth 260d, fifth 260e, and sixth 260f tap sensitive targets. Therefore, the size of the tap sensitive targets 262 may be organized with a hierarchical structure based on a value associated with each corresponding user interactive region 260 and/or tap sensitive target 262, and the size of each tap sensitive target 262 may be scaled to reflect the assigned value of data for each specific user interactive region 260 and/or tap sensitive target 262.

In some implementations, if a value associated with one or more of the tap sensitive targets 262 changes or is modified, then the size of the changed or modified tap sensitive targets 262 changes or is modified to reflect the changed or modified value associated therewith. For instance, in an example, if a value for Data 1 associated with the first tap sensitive target 262a increases, then the size of the first tap sensitive target 262a increases accordingly to reflect the increased value associated therewith. In another example, if a value for Data 3 associated with the third tap sensitive target 262c decreases, then the size of the third tap sensitive target 262c decreases accordingly to reflect the decreased value associated therewith.

In some implementations, the computing device 204 may be configured to display each of the user interactive regions 260 along with a specified user interactive region 270 (e.g., other) according to each scalable value associated therewith. Further, the computing device 204 may be configured to group one or more of the user interactive regions 260 that are dimensionally smaller than a tap target size predefined for each tap sensitive target 262 into the specified user interactive region 270 that is expandable upon selection thereof via tactile gesture, e.g., by a user.

In various implementations, the tap target size of each tap sensitive target 262 may include a block of pixels having predefined dimensions. In some examples, the predefined dimensions may include a two-dimensional (2D) geographical region having, e.g., a length measured in pixels and a width measured in pixels. In various examples, the pixel length may include any dimensional length of pixels measured along a side of the tap sensitive target 262, and the pixel width may include any dimensional width of pixels measured along another side of the tap sensitive target 262. For instance, in some examples, dimensions of the tap sensitive target 262 may include 45 pixels by 45 pixels (i.e., 45×45 pixels) or any m pixels by n pixels (i.e., m×n pixels).

In an implementation, the example of FIG. 2A shows a display and/or map of a first plurality of user interactive regions 260a, 260b, 260c, 260d, 260e, 260f along with the specified user interactive region 270 (e.g., other) according to each scalable value associated therewith. Further, in an implementation, the example of FIG. 2B shows another display and/or map of a second plurality of user interactive regions 260g, 260h, 260i, 260j, 260k, along with another specified user interactive region 280 (e.g., other) according to each scalable value associated therewith. Therefore, in some examples, the computing device 204 may be configured to display an expanded region having one or more additional user interactive regions 260 along with another specified user interactive region 280 that is expandable upon selection thereof via tactile gesture, e.g., by a user.

Figure 3:
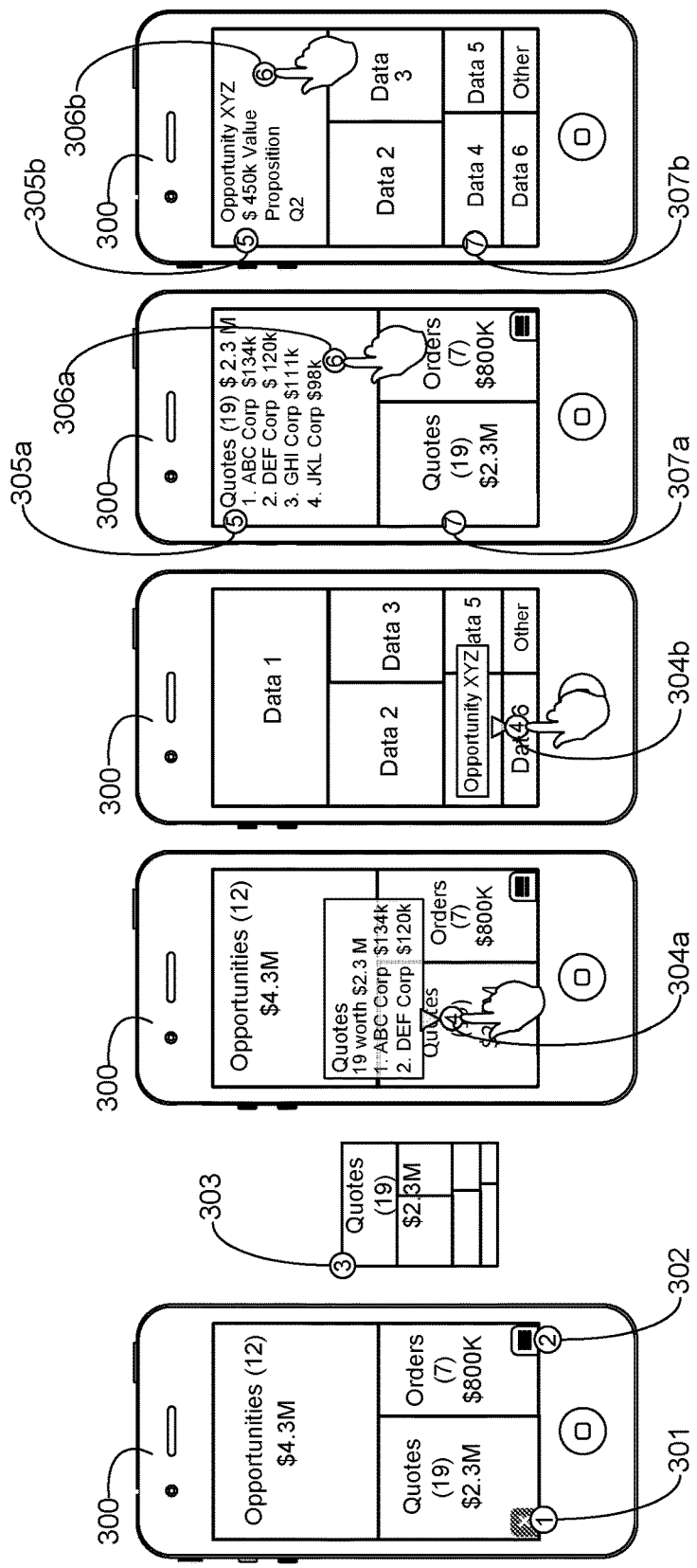
FIGS. 3-7 are block diagrams illustrating example visualization contexts and various example techniques for interaction therewith, in accordance with aspects of the disclosure.

FIGS. 3-7 are block diagrams illustrating example visualization contexts and various example techniques for interaction therewith, in accordance with aspects of the disclosure. In particular, FIG. 3 is a block diagram illustrating example techniques for interaction with visualization contexts displayed on a mobile communication device, in accordance with aspects of the disclosure.

In some examples, as described herein, the visualization contexts may be displayed on a mobile communication device 300, such as, e.g., a mobile phone. Since display area on mobile communication device 300 may be confined by dimensions of its display, the visualization context may be applied in full-screen view for displaying a map, layout, or arrangement of the user interactive regions.

In an example, a first interaction 301 may include a selection (e.g., via tactile input by a user, such as a finger tap) on an "X" button to leave the current screen displaying a visualization context and return to a previous screen. The "X" button may be configured to slide out of view after a period of time, such as a short period of time.

In another example, a second interaction 302 may include a selection (e.g., via tactile input by a user, such as a finger tap) on a view button to switch between a list view and a cell view (or region view), where an icon may change to show another view option. The view button may be configured to slide out of view after a period of time, such as a short period of time.

In another example, a third interaction 303 may include output of a visual design for mapping of visualization contexts that may be configured to provide an insight view into a next level of information for display. The insight view may show or display the visualization contexts as a map, layout, or arrangement of the user interactive regions for the next level of information that may be displayed.

In another example, one or more forth interactions 304a, 304b may include various selection sequence types for user interactive regions (e.g., via tactile input by a user, such as various types of finger tap sequences) including a single tap, tap and hold, or tap and slide (or wipe) in reference to a specifically selected user interactive region, which may be configured to invoke a pop-over showing information for a specific node, such as, e.g., a minimal amount of information about the node.

In another example, one or more fifth interactions 305a, 305b may include various selection sequence types for user interactive regions (e.g., via tactile input by a user, such as various types of finger tap sequences) including releasing a tap/hold/slide sequence may bring up an information box (or pop-up display) in reference to a specific user interactive region at a particular portion of the display, which may include additional information in reference to a particular node.

In another example, one or more sixth interactions 306a, 306b for user interactive regions may include tapping the information box (or pop-up display) for a specific user interactive region, which may navigate a user to an object inspector view or portal, where one or more of a scroll, tap, hold, or slide (or wipe) anywhere on the display may be configured to hide the information box.

In another example, one or more seventh interactions 307a, 307b for user interactive regions may include a visual indicator that may be configured to show which user interactive region on the display is selected.

Figure 4:
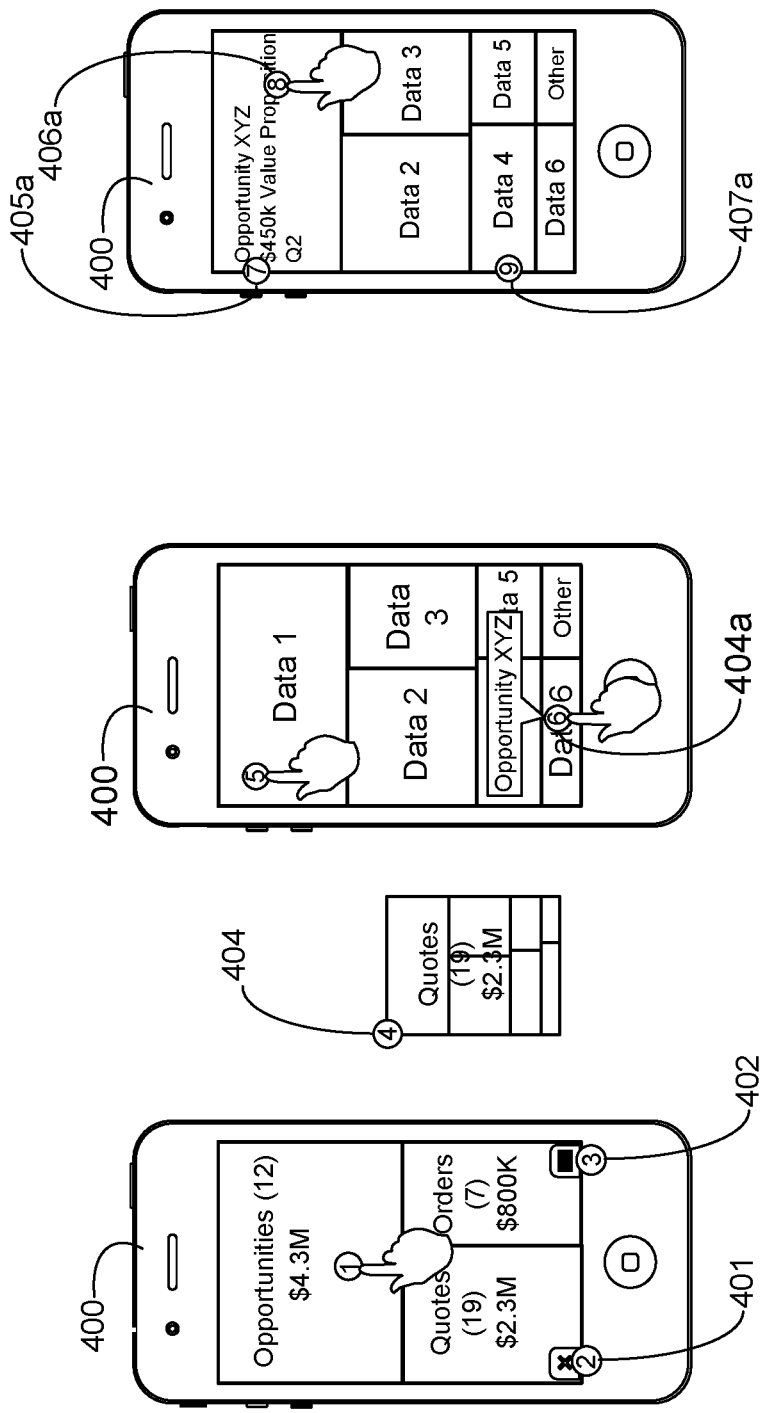

FIG. 4 is a block diagram illustrating other example techniques for interaction with visualization contexts displayed on a mobile communication device, in accordance with aspects of the disclosure.

In some examples, as described herein, the visualization contexts may be displayed on a mobile communication device 400, such as, e.g., a mobile phone. Since display area on mobile communication device 400 may be confined by dimensions of its display, the visualization context may be applied in full-screen view for displaying a map, layout, or arrangement of the user interactive regions.

In an example, a first interaction 401 may include selection of a user interactive region (e.g., via tactile input by a user, such as a finger input sequence), where in a first level, a single tap or a pinch open on a user interactive region navigates to a next level of detail (e.g., individual opportunities).

In another example, a second interaction 402 may include selection of a user interactive button (e.g., via tactile input by a user), where a tap on an "X" button may be configured to navigate from the current visualization context map and return to a previous visualization context map.

In another example, a third interaction 403 may include selection of a user interactive button (e.g., via tactile input by a user), where a tap on a view button may be configured to switch between a list view and a cell view (or region view). An icon may change to show some other view option. The "X" button and view button may slide out of view after period of time, such as, e.g., a short period of time.

In another example, a forth interaction 404 may include output of a visual design for mapping of visualization contexts that may be configured to provide an insight view into a next level of information for display. The insight view may show or display the visualization contexts as a map, layout, or arrangement of the user interactive regions for the next level of information that may be displayed.

In another example, a fifth interaction 405 may include selection of a user interactive region (e.g., via tactile input by a user, such as a finger input sequence), where a back button or a pinch close may navigate a user back to a previous level.

In another example, a sixth interaction 406 may include selection of a user interactive region (e.g., via tactile input by a user, such as a finger input sequence), where a single tap, tap and hold, or tap and slide (or wipe) may be configured to invoke a pop-over showing information for a specific node, such as, for example, a minimal amount of information about the node.

In another example, a seventh interaction 407 may include selection of a user interactive region (e.g., via tactile input by a user, such as a finger input sequence), where releasing a tap/hold/slide may bring up an information box (or pop-up display) in reference to a specific user interactive region at a particular portion of the display, which may include additional information in reference to a particular node.

In another example, a eighth interaction 408 may include selection of a user interactive region (e.g., via tactile input by a user, such as a finger input sequence), where tapping the information box may navigate a user to an object inspector view or portal, where one or more of a scroll, tap, hold, or slide (or wipe) anywhere on the display may be configured to hide the information box.

In another example, a ninth interaction 409 for user interactive regions may include a visual indicator that may be configured to show which user interactive region on the display is selected.

Figure 5:
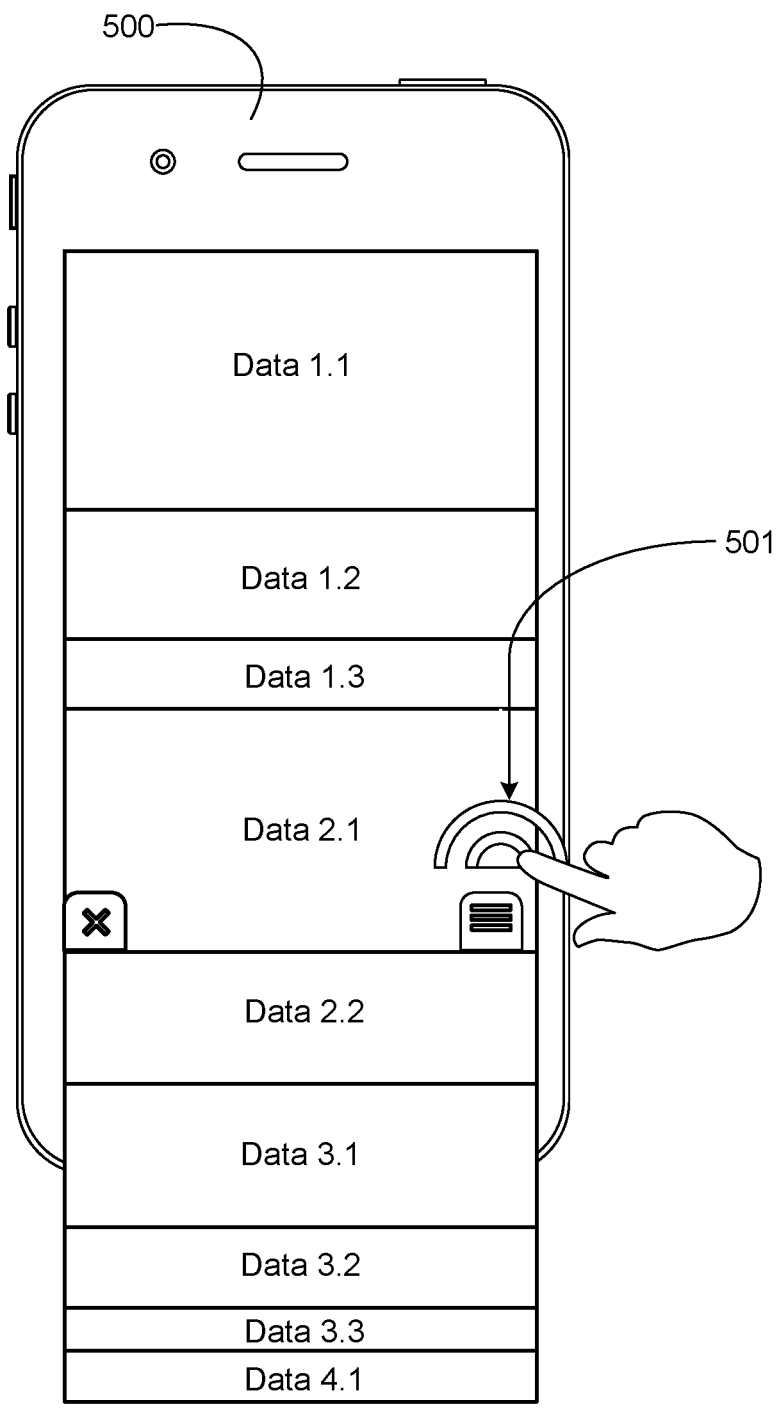

FIG. 5 is a block diagram illustrating another example technique for interaction with visualization contexts displayed on a mobile communication device, in accordance with aspects of the disclosure.

In some examples, as described herein, the visualization contexts may be displayed on a mobile communication device 500, such as, e.g., a mobile phone. Since display area on mobile communication device 500 may be confined by dimensions of its display, the visualization context may be applied in full-screen view for displaying a map, layout, or arrangement of the user interactive regions.

In some examples, as shown in FIG. 5, the visualization context may be displayed in a list view. For instance, an interaction 501 may include selection of a user interactive button, cell, or region (e.g., via tactile input by a user, such as a finger input sequence), where visualization contexts for various data and information (e.g., Data 1.1, Data 1.2, Data 1.3, Data 2.1, etc.) may be displayed in a list view.

In various implementations, the categories and/or subcategories are visible in a scrolling display or screen, and various data and information of specific objects may be displayed in the list view. In some interactions, a single tapping on a user interactive regions navigate a user to a related inspector, where a visual indicator may be configured to show which user interactive region on the display is selected.

Figure 6:
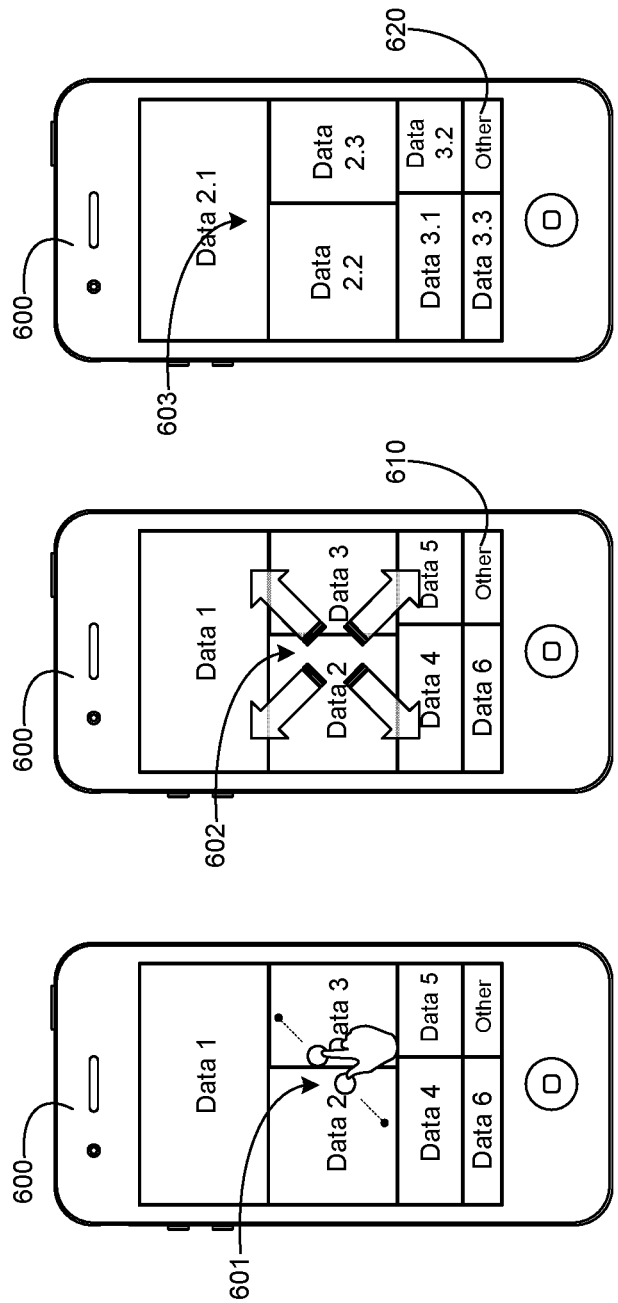

FIG. 6 is a block diagram illustrating another example technique for interaction with visualization contexts displayed on a mobile communication device, in accordance with aspects of the disclosure.

In some examples, as described herein, the visualization contexts may be displayed on a mobile communication device 600, such as, e.g., a mobile phone. Since display area on mobile communication device 600 may be confined by dimensions of its display, the visualization context may be applied in full-screen view for displaying a map, layout, or arrangement of the user interactive regions.

In some examples, as shown in FIG. 6, various visualization contexts may be displayed in a cell view (or region view), and navigation for the various visualization contexts may be provided for a user to directly interact and/or manipulate each of the various visualization contexts. In some examples, as shown in FIG. 6, a first interaction 601 may include selection of a user interactive region (e.g., via tactile input by a user, such as a finger input sequence), where a pinch open may be configured to expose detailed information related to a specific user interactive region. For instance, on pinch open, the visualization context related to a specific user interactive region may be configured to function similar to a geographic type map.

In some examples, as shown in FIG. 6, a second interaction 601 may include selection of a user interactive region (e.g., via tactile input by a user, such as a finger input sequence), where a zoom center may be where a pinch open occurred. In some examples, visualization context categories and/or subcategories may be moved off screen as a whole or in part in an orderly manner. In this example, a point between Data 2 and Data 3 may be the center, so sections before and after them may fall off first (e.g., Data 1 and other may be the first to fall off first).

In some examples, as shown in FIG. 6, a third interaction 603 may include consolidating one or more cells or regions in another cell or region that may be labeled as "other" or "more" cell or region 610. For instance, after a pinch open is completed, the map of the visualization contexts may be configured to resize and/or repopulate to use available display area or space. Further, a user may pinch open/close to alter the map of the visualization contexts one or more times or repeatedly, where when cells or regions are changed or modified to become less than a predefined or personalized tap size (e.g., 7-10 mm), remaining cells or regions may be consolidated into the "other" or "more" cell or region 610. In some examples, the "other" or "more" cell or region 610 may be configured to be zoomed into, and then this may appear as another map 603 of one or more visualization contexts having another "other" or "more" cell or region 620. Further, data in the "other" or "more" category may resize and/or repopulate into individual cells or regions, as display area or space allows. Further, the "other" or "more" category 620 may be displayed with less data and information.

Figure 7:
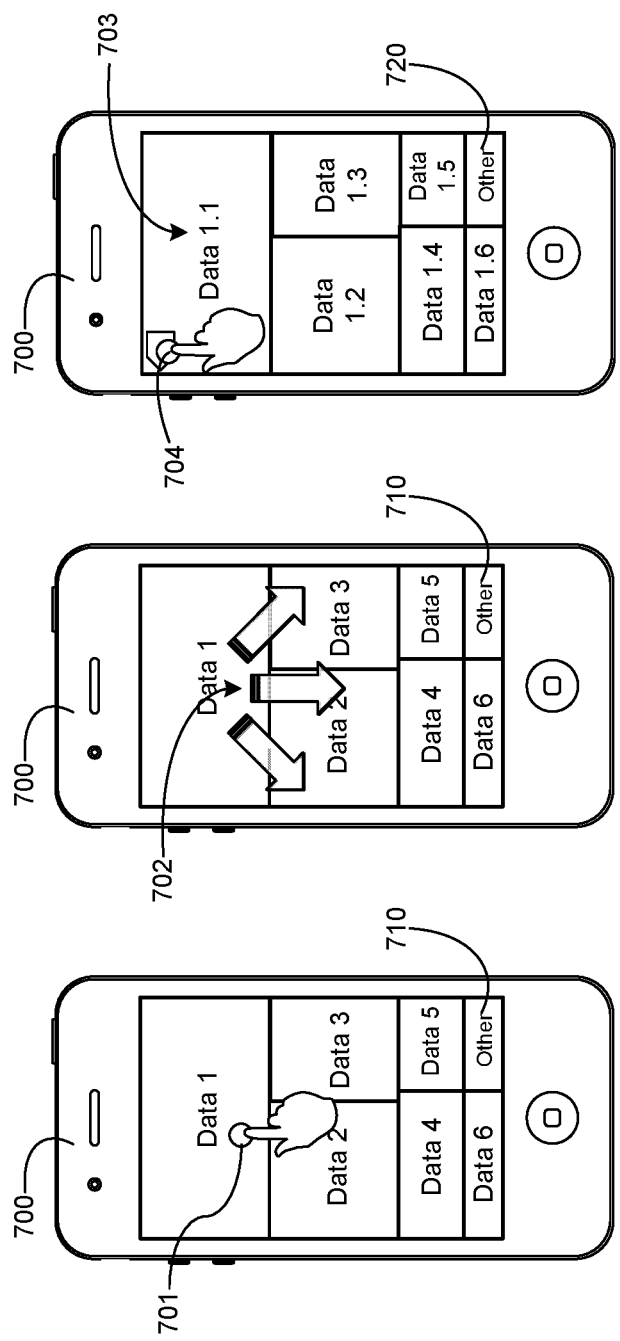

FIG. 7 is a block diagram illustrating another example technique for interaction with visualization contexts displayed on a mobile communication device, in accordance with aspects of the disclosure.

In some examples, as described herein, the visualization contexts may be displayed on a mobile communication device 700, such as, e.g., a mobile phone. Since display area on mobile communication device 700 may be confined by dimensions of its display, the visualization context may be applied in full-screen view for displaying a map, layout, or arrangement of the user interactive regions.

In some examples, as shown in FIG. 7, various visualization contexts may be displayed in a cell view (or region view), and navigation for the various visualization contexts may be provided for a user to directly interact and/or manipulate each of the various visualization contexts. In some examples, as shown in FIG. 7, a first interaction 701 may include selection of a user interactive region (e.g., via tactile input by a user, such as a finger input sequence), where entire first level of the map of visualization contexts may be shown on a first display or screen. In some examples, a user may provided tactile input, such as, e.g., a tap, slide or wipe 702, on one of cells or regions for navigation to a second level 703 of map of visualization contexts. The visualization context map may be configured to visually zoom in on an area, cell, region, or section selected, revealing more data and/or information. Further, a second interaction 604 may include selection of a user interactive region (e.g., via tactile input by a user, such as a finger input sequence), where a user taps on user interactive back button for navigation to the first level of the visualization context map.

Figure 8:
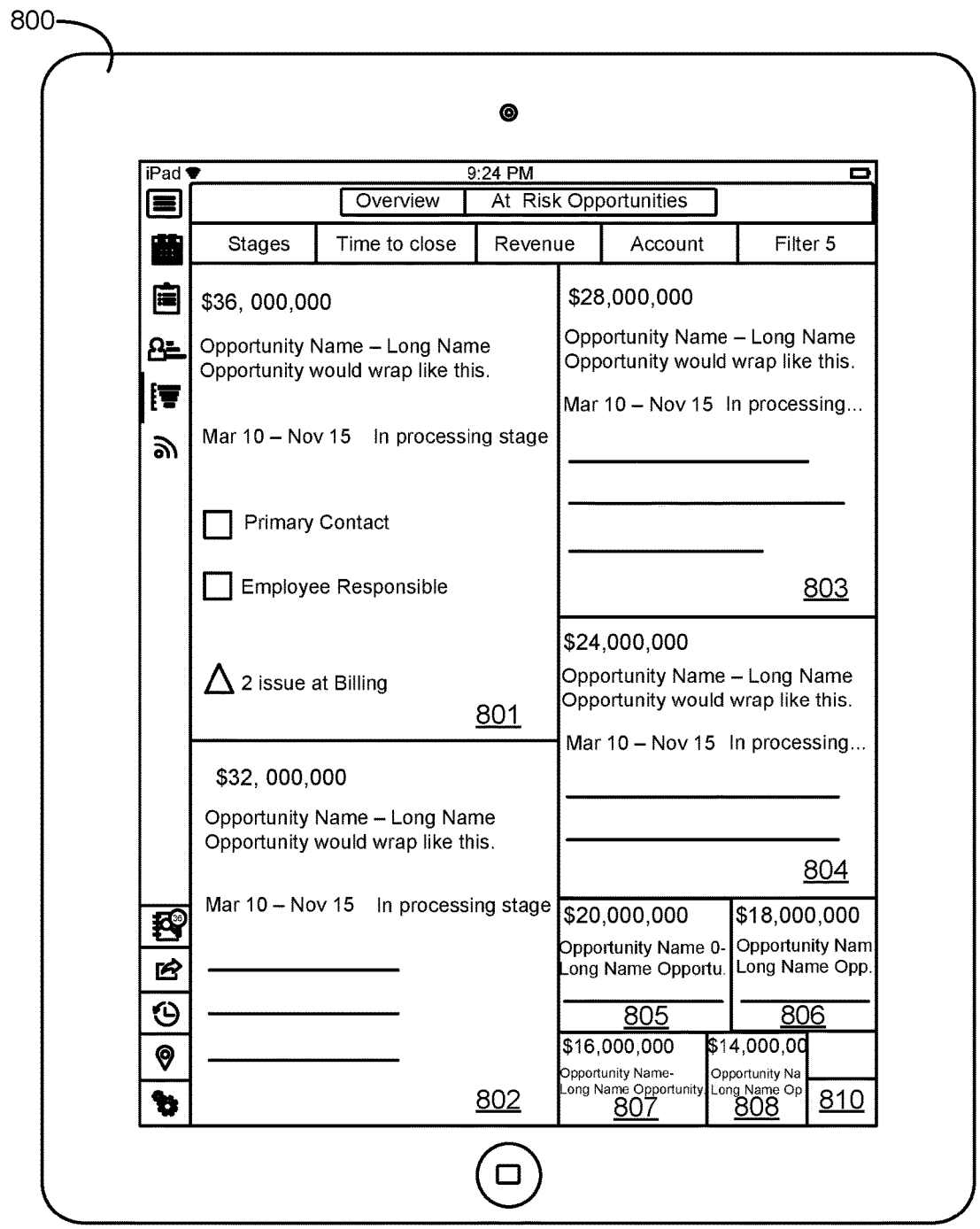
FIGS. 8-10 are block diagrams illustrating example visualization contexts, in accordance with aspects of the disclosure.
Figure 9:
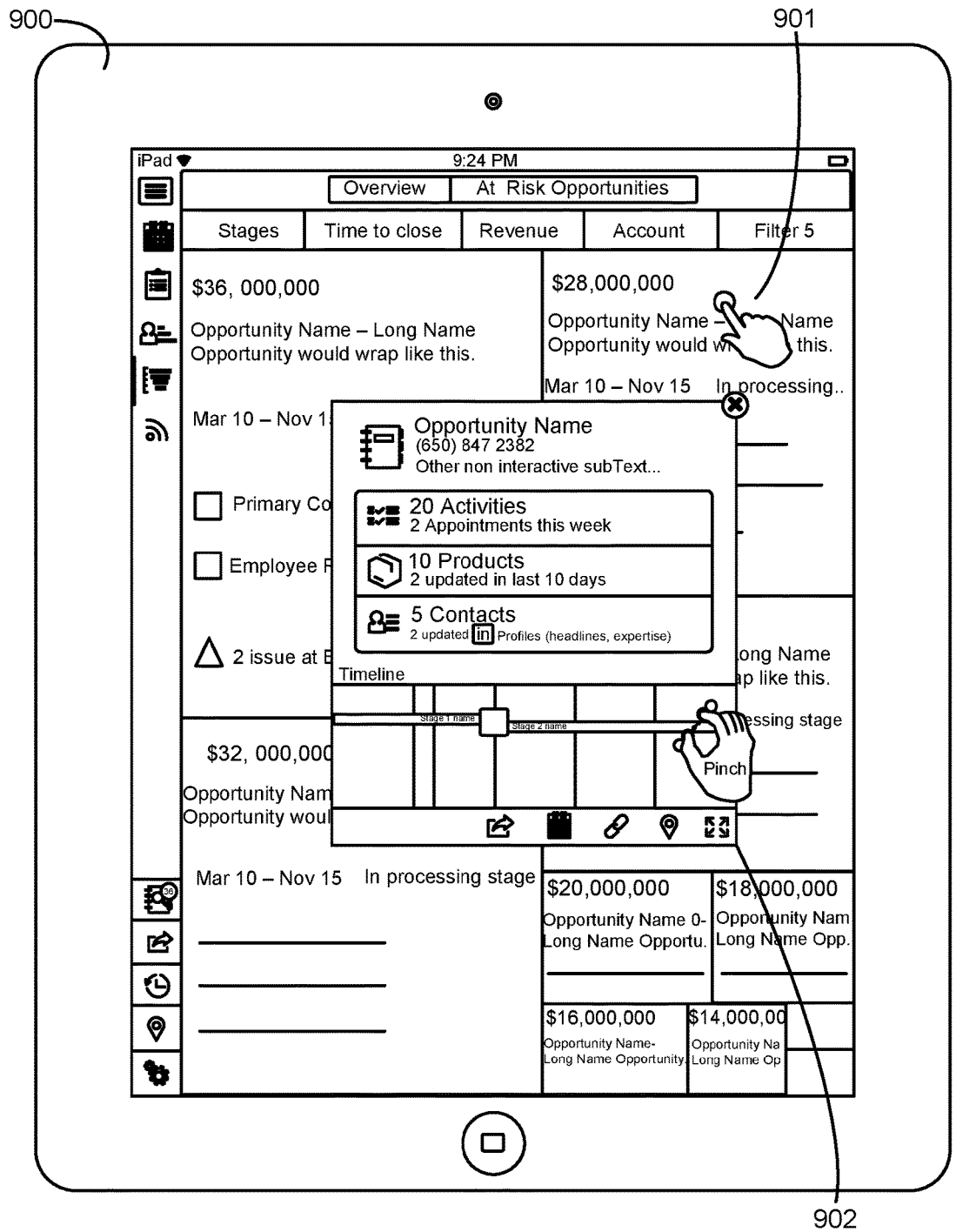
Figure 10:
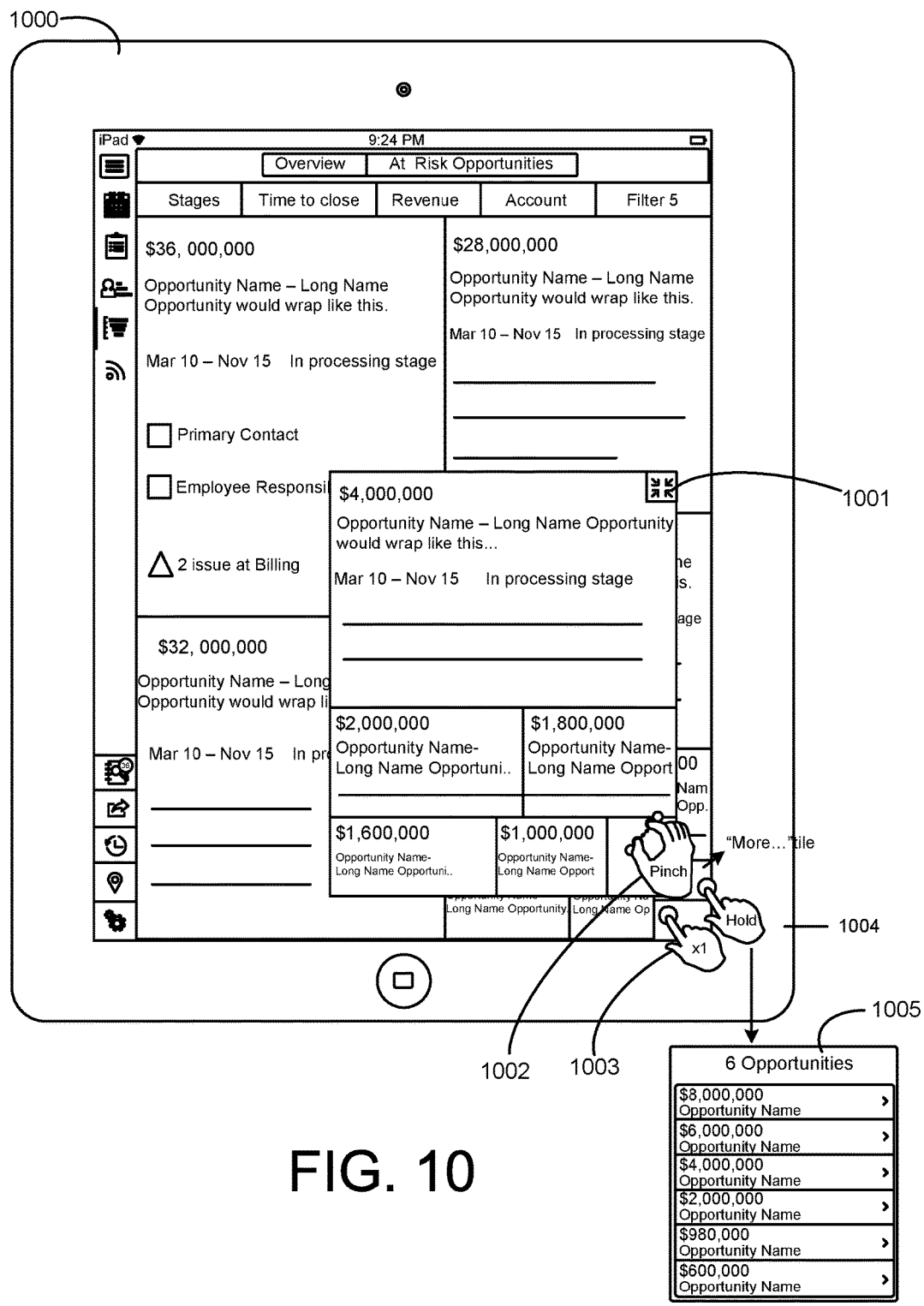

FIGS. 8-10 are block diagrams illustrating example visualization contexts, in accordance with aspects of the disclosure. In particular, FIG. 8 is a block diagram illustrating an example technique for interaction with visualization contexts displayed on a mobile communication device, in accordance with aspects of the disclosure.

In some examples, as described herein, the visualization contexts may be displayed on a mobile communication device 800, such as, e.g., a mobile phone. Since display area on mobile communication device 800 may be confined by dimensions of its display, the visualization context may be applied in full-screen view for displaying a map, layout, or arrangement of the user interactive regions.

In some examples, as shown in FIG. 8, various visualization contexts may be displayed as a contextual worksheet, where the various visualization contexts are used to spatially organize objects by two attributes, such as, e.g., size and color. In some examples, size of a user interactive region may represent a measure, value, or property of specific visualization contexts, and color of a user interactive region may represent a parameter or sentiment based on a measure and/or an alert in reference to the specific visualization context. Further, in some examples, an algorithm for mapping visualization contexts may be anyone that meets one or more of the following considerations:

1. Largest visualization context item may be placed at a top left position, such as, e.g., in a user interactive region 801.
2. Smallest visualization context item may be placed at the bottom right position, such as, e.g., in another user interactive region 808.
3. Each visualization context item may be as close to a region, as possible.
4. When visualization context items are unable to display a primary value in one line, at a lowest specified font size, the visualization context map may begin aggregating (or consolidating) smaller sized visualization context items into at least one grouping that may be referred to as a "More . . . " or "Other . . . " user interactive region 810.
5. If one or more visualization context items aggregated (or consolidated) within the "More . . . " or "Other . . . " user interactive region 810 have, e.g., a color sentiment attached, then the "More . . . " or "Other . . . " region 810 takes on that sentiment.

In some examples, as shown in FIG. 8, the visualization contexts of the user interactive regions 260 may be configured to display hierarchical information using nested geographical regions, such as, e.g., rectangular regions. For instance, as shown in the example of FIG. 8, the visualization context maps may be utilized to organize various types of data and information into a hierarchical arrangement such as, e.g., a first user interactive region 801 includes a largest value associated therewith and includes the largest dimensional scale in comparison to the scale of other regions. Further, a second user interactive region 802 includes a next largest value associated therewith and includes the next largest scale in comparison to the other regions. This hierarchical arrangement proceeds through the remaining user interactive regions 803, 804, 805, 806, 807 in order of size to a smallest user interactive region 808, which includes a smallest value associated therewith and includes the smallest dimensional scale in comparison to the scale of other regions. Further, in some examples, the "More . . . " or "Other . . . " grouping of the specified user interactive region 810 may have a smaller dimensional size than the smallest user interactive region 808.

FIG. 9 is a block diagram illustrating other example techniques for interaction with visualization contexts displayed on a mobile communication device, in accordance with aspects of the disclosure.

In some examples, as described herein, the visualization contexts may be displayed on a mobile communication device 900, such as, e.g., a mobile phone. Since display area on mobile communication device 900 may be confined by dimensions of its display, the visualization context may be applied in full-screen view for displaying a map, layout, or arrangement of the user interactive regions.

In an example, a first interaction 901 may include selection of a user interactive region (e.g., via tactile input by a user, such as a finger input sequence), where a user may tap a user interactive region to open a window that may center the specifically selected user interactive region in the display or screen.

In another example, a second interaction 902 may include selection of a user interactive region (e.g., via tactile input by a user, such as a finger input sequence), where a pinch open on visualization context map surface to thereby zoom the pinched visualization context item to show an object overview. In some examples, at a start of a pinch gesture, if a user has fingers on two different opportunities, then expand the entire the visualization context map by a predefined amount, such as, e.g., −5% and then stop the zoom. On release, return the visualization context map to an original size.

For visualization context items that may not be large enough in the visualization context map to show an entire preview, when a user invokes pinch open and does not release the gesture/surface, the visualization context item may increase in size with an increasing pinch and may continue to incrementally show information from the preview (depending on space available). This may occur until a size of the visualization context item is as large as an object overview. If a user continues to pinch open beyond that, the size of the item may be locked. On release, the object overview may be centered to a content area, and information from the object overview may be loaded.

In some examples, an interaction of a pinch close on a first level of the visualization context map may shrink the visualization context map by a predefined amount, such as, e.g., −5% after which it may stop shrinking. When a user releases the gesture, the visualization context map may snap back to its original size. Further, a textured background may be shown when shrinkage is in progress.

In some examples, when a user releases a gesture and an item size is less than 50% of object overview size, it may collapse back to its location. Further, in some other examples, when a user releases a gesture and an item size is larger than 50% of an object overview size, then the item continues to increase in size until it reaches a size of the object overview. Further, the object overview information may be loaded once the item reaches this size.

FIG. 10 is a block diagram illustrating other example techniques for interaction with visualization contexts displayed on a mobile communication device, in accordance with aspects of the disclosure.

In some examples, as described herein, the visualization contexts may be displayed on a mobile communication device 1000, such as, e.g., a mobile phone. Since display area on mobile communication device 1000 may be confined by dimensions of its display, the visualization context may be applied in full-screen view for displaying a map, layout, or arrangement of the user interactive regions.

In an example, a first interaction 1001 may include selection of a user interactive region (e.g., via tactile input by a user, such as a finger input sequence), where a user may tap a minimize button to return an expanded "more" or "other" region to its original size.

In another example, a second interaction 1002 may include selection of a user interactive region (e.g., via tactile input by a user, such as a finger input sequence), where a pinch gesture may be used. For instance, when a user invokes a pinch open on the "More . . . " or "Other . . . " region and does not release the gesture/surface, the "More . . . " or "Other . . . " region may increase in size with an increasing pinch and continue to incrementally show information from preview (depending on space available). In some examples, larger regions within the "More . . . " or "Other . . . " region may begin to show more information more rapidly than smaller regions.

In some examples, when a user releases a gesture and item size is less than 50% of content area, it may collapse back to its location. Further, when a user releases a gesture and an item size is larger than 50% of content area, the item may continue to increase in size and may become a full screen inspector.

In some examples, a single tap 1003 on the "More . . . " or "Other . . . " region may be configured to expand the "More . . . " or "Other . . . " region, which may populate the entire display screen. Further, a user may pinch close on the "More . . . " or "Other . . . " region surface to return it to its original size. Further, a minimize button may be provided to ensure that a user may tap to reduce the "More . . . " or "Other . . . " region surface.

In some examples, a tap and hold 1004 one the "More . . . " or "Other . . . " region may be configured to invoke a pop-over window 1005 with a list of items that populate the "More . . . " or "Other . . . " region. Further, in some examples, tapping an item in the pop-over window 1005 shows the object overview in the pop-over.

Figure 11:
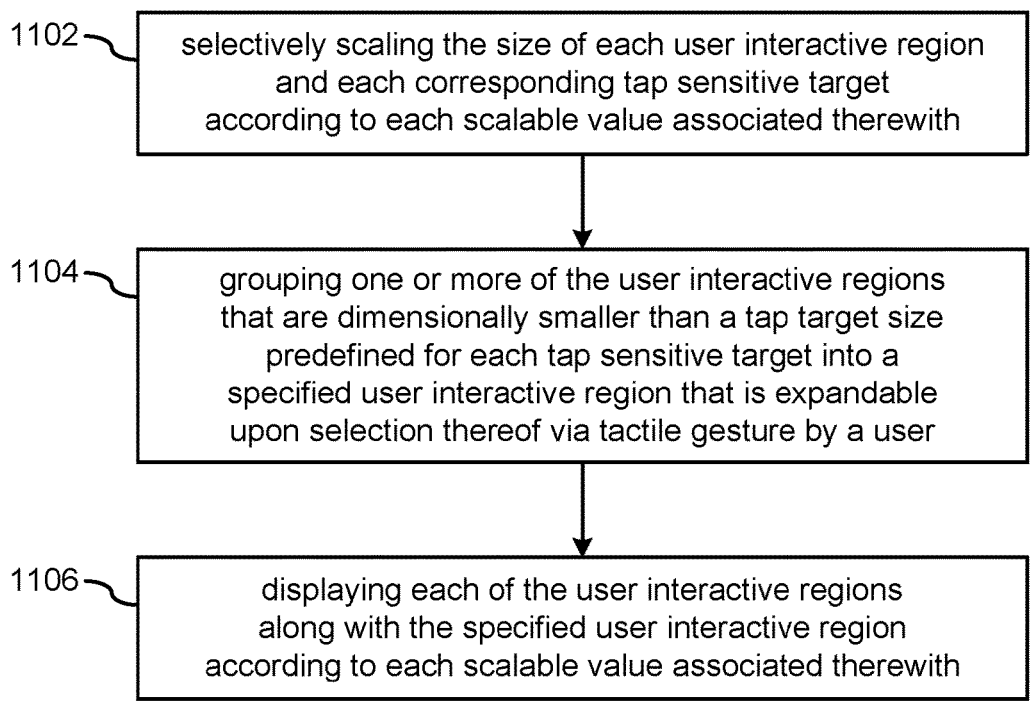
FIG. 11 is a process flow illustrating an example method for mapping visualization contexts, in accordance with aspects of the disclosure.

FIG. 11 is a process flow illustrating an example method 1100 for mapping visualization contexts, in accordance with aspects of the disclosure.

In the example of FIG. 11, operations 1102-1106 are illustrated as discrete operations occurring in sequential order. However, it should be appreciated that, in other various implementations, two or more of the operations 1102-1106 may occur in a partially or completely overlapping or parallel manner, or in a nested or looped manner, or may occur in a different order than that shown. Further, additional operations, that may not be specifically shown in the example of FIG. 11, may be included in some implementations, while, in various other implementations, one or more of the operations 1102-1106 may be omitted. Further, in various examples, the method 1100 may include a process flow for a computer-implemented method for mapping visualization contexts in the system 100 of FIG. 1. Further, as described herein, the operations 1102-1106 may provide a simplified operational process flow that may be enacted by the computer system 104 to provide features and functionalities as described in reference to FIG. 1.

In various aspects of the disclosure, the method 1100 of FIG. 11 may be provided for displaying a plurality of user interactive regions having corresponding tap sensitive targets for each of a plurality of scalable values representing a visualization context associated with each user interactive region while maintaining a size of each user interactive region and each corresponding tap sensitive target according to each scalable value associated therewith.

At 1102, the method 1100 of FIG. 11 may include selectively scaling the size of each user interactive region and each corresponding tap sensitive target according to each scalable value associated therewith.

At 1104, the method 1100 may include grouping one or more of the user interactive regions that are dimensionally smaller than a tap target size predefined for each tap sensitive target into a specified user interactive region that is expandable upon selection thereof via tactile gesture by a user.

At 1106, the method 1100 may include displaying each of the user interactive regions along with the specified user interactive region according to each scalable value associated therewith.

In some implementations, the method 1100 may include displaying an expanded region having one or more additional user interactive regions along with another specified user interactive region that is expandable upon selection thereof via tactile gesture by the user. The method 1100 of FIG. 11 may include selectively scaling the size of each tap sensitive target according to a user tactile input via tactile gesture by the user. The method 110 may include measuring available display area of the display, and partitioning the available display area into the plurality of user interactive regions.

In various examples, each interactive region and each corresponding tap sensitive target may occupy a same partitioned area on the display. The tap target size may include a block of pixels having predefined dimensions. Each of the plurality of scalable values may represent a predefined property associated with information related to the user. Each visualization context may represent each corresponding scalable value as scale of the associated user interactive region. Each visualization context may represent each corresponding scalable value as a textual property for text in each associated user interactive region including at least one of font size of the text, font type of the text, and font color of the text. Each visualization context may represent each corresponding scalable value as a regional property for each associated user interactive region including at least one of orientation for each associated user interactive region, outline shape for each associated user interactive region, outline color for each associated user interactive region, and background color for each associated user interactive region.

Figure 12:
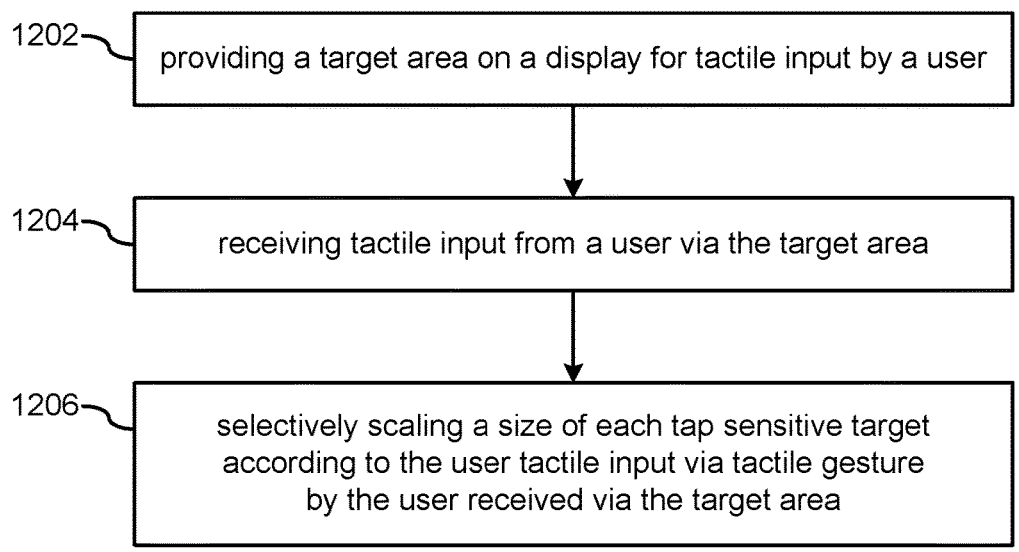
FIG. 12 is a process flow illustrating an example method for personalizing tap sensitive targets, in accordance with aspects of the disclosure.

FIG. 12 is a process flow illustrating an example method 1200 for personalizing tap sensitive targets 262, in accordance with aspects of the disclosure.

In the example of FIG. 12, operations 1202-1206 are illustrated as discrete operations occurring in sequential order. However, it should be appreciated that, in other various implementations, two or more of the operations 1202-1206 may occur in a partially or completely overlapping or parallel manner, or in a nested or looped manner, or may occur in a different order than that shown. Further, additional operations, that may not be specifically shown in the example of FIG. 12, may be included in some implementations, while, in various other implementations, one or more of the operations 1202-1206 may be omitted. Further, in various examples, the method 1200 may include a process flow for a computer-implemented method for mapping visualization contexts in the system 100 of FIG. 1. Further, as described herein, the operations 1202-1206 may provide a simplified operational process flow that may be enacted by the computer system 104 to provide features and functionalities as described in reference to FIG. 1.

In various aspects of the disclosure, the method 1200 of FIG. 12 may be provided for displaying a plurality of user interactive regions having corresponding tap sensitive targets for each of a plurality of scalable values representing a visualization context associated with each user interactive region while maintaining a size of each user interactive region and each corresponding tap sensitive target according to each scalable value associated therewith.

At 1202, the method 1200 of FIG. 12 may include providing a target area on a display for tactile input by a user. At 1204, the method 1200 may include receiving tactile input from a user via the target area. At 1206, the method 1200 may include selectively scaling a size of each tap sensitive target according to the user tactile input via tactile gesture by the user received via the target area.

In some implementations, the method 1200 may include receiving input for a number of entities (e.g., number of user interactive regions) for visualization in the visualization context map. Further, the method 1200 may include receiving input for minimum values and/or maximum values for relative sizing and/or color definition to depict dimensional size and/or traits for user interactive regions (e.g., a color of green may symbolize good, a color of red may symbolize bad, color of yellow may symbolize caution, etc.). Further, the method 1200 may include receiving input for personalized tap target size that may be measurable by placing a preferred tap finger on the display or screen. In various examples, a preferable and/or personalized tap target size may be auto-detected, and user interactive regions may be sized accordingly.

In various implementations, aspects of the disclosure provide systems and methods that implement various interaction models for mapping visualization contexts in user interactive regions on a computing system or device, such as a mobile device including a mobile communication device. For instance, the systems and methods allow a user to interact with user interactive regions having corresponding tap sensitive targets for each of a plurality of scalable values representing the visualization contexts. The scalable values allow for dimensional scaling of size of boxes, regions, areas of each user interactive region. The systems and methods allow for grouping user interactive regions that are smaller than a tap-sized target into a "more" or "other" section that may be separately displayed in a specified user interactive region. The systems and methods allow for user gestures to interact with the "more" or "other" group. The systems and methods allow for personalized tap target to be sized to receive a user interactive tap with tactile input, including various tactile gestures, such as, e.g., a finger tap, finger tap and hold, or finger slide (or finger wipe). Various actions may be provided specific for tactile finger gestures. The systems and methods allow for grouping, processing for grouping, successive grouping, measuring size of display area, personalization, user input, measuring finger for tap target size, setting min/max dimensional values for scaling size, etc. The systems and methods allow for ability to interact with visualization context maps with mobile device using, from example, scalable algorithms that measure available display area, partition display area into a plurality of interactive regions, and implement value properties to be used on any mobile device, size of text as size of region, below certain font size. The systems and methods allow for mapping visualization contexts to scale to any device, automatically. The systems and methods allow for input, including number of values, size of each value, etc. The systems and methods allow for displaying visualization context map with user interactive regions with each having a tap sensing region or tap sensitive target with scalable tap target dimensions/sizes, pixel blocks, and scalable minimum/maximum values.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computing system comprising:
a mobile communication device having at least one processor, display, and memory; and
a visualization mapper configured to cause the at least one processor to display a plurality of user interactive regions having respective sizes on a touch screen adjacent to each other in a size-based hierarchy, each user interactive region including a finger tap sensitive target that is configured to receive an interactive finger tap by a user touching the finger tap sensitive target, the each user interactive region and the included finger tap sensitive target being associated with a respective scalable value, the respective scalable values representing a visualization context associated with the each user interactive region, the visualization mapper including:
an algorithm handler configured to cause the at least one processor to selectively scale the size of each user interactive region and included finger tap sensitive target according to the respective scalable values associated therewith,
a grouping handler configured to cause the at least one processor to group, based on a determination that one or more of the selectively scaled user interactive regions are dimensionally smaller than a predefined finger tap target size on the touch screen, the one or more of the selectively scaled user interactive regions on the touch screen into a specified user interactive region on the touch screen that is larger than the predefined finger tap target size, the specified user interactive region being expandable in size, upon selection thereof by a user touching the finger tap sensitive target included in the specified user interactive region, to ungroup and display a plurality of constituent selectively scaled user interactive regions of the specified user interactive region at sizes larger than the predefined finger tap target size, and
a display handler configured to cause the at least one processor to display each of the user interactive regions on the touch screen along with the specified user interactive region according to each scalable value associated therewith,
wherein, receipt of the selection thereof by the user causes the specified, expandable user interactive region to undergo expansion to incrementally display the plurality of constituent selectively scaled user interactive regions in a second size-based hierarchy, in which larger regions thereof display included information more rapidly than smaller regions thereof during the expansion.

2. The system of claim 1, further comprising a personalization handler configured to cause the at least one processor to selectively scale the size of each finger tap sensitive target according to a user tactile input via tactile gesture by the user.

3. The system of claim 1, wherein the algorithm handler is configured to cause the at least one processor to:
measure available display area of the display, and
partition the available display area into the plurality of user interactive regions.

4. The system of claim 1, wherein each of the user interactive regions and each corresponding finger tap sensitive target occupy a same partitioned area on the display.

5. The system of claim 1, wherein the finger tap target size includes a block of pixels having predefined dimensions.

6. The system of claim 1, wherein each of the scalable values represents a predefined property associated with information related to the user.

7. The system of claim 1, wherein each visualization context represents each corresponding scalable value as scale of the associated user interactive region.

8. The system of claim 1, wherein each visualization context represents each corresponding scalable value as a textual property for text in each associated user interactive region including at least one of font size of the text, font type of the text, and font color of the text.

9. The system of claim 1, wherein each visualization context represents each corresponding scalable value as a regional property for each associated user interactive region including at least one of orientation for each associated user interactive region, outline shape for each associated user interactive region, outline color for each associated user interactive region, and background color for each associated user interactive region.

10. A computer program product, the computer program product being tangibly embodied on a non-transitory computer-readable storage medium and including instructions that, when executed by at least one processor, are configured to:
display a plurality of user interactive regions having respective sizes on a touch screen adjacent to each other in a size-based hierarchy, each user interactive region including a finger tap sensitive target that is configured to receive an interactive finger tap by a user touching the finger tap sensitive target, the each user interactive region and the included finger tap sensitive target being associated with a respective scalable value, the respective scalable values representing a visualization context associated with the each user interactive region, the instructions including instructions that, when executed by the at least one processor, are further configured to:
selectively scale the size of each user interactive region and included finger tap sensitive target according to the respective scalable values associated therewith,
group, based on a determination that one or more of the selectively scaled user interactive regions are dimensionally smaller than a predefined finger tap target size on the touch screen, the one or more of the selectively scaled user interactive regions into a specified user interactive region on the touch screen that is larger than the predefined finger tap target size, the specified user interactive region being expandable in size, upon selection thereof by a user touching the finger tap sensitive target included in the specified user interactive region, to ungroup and display a plurality of constituent selectively scaled user interactive regions of the specified user interactive region at sizes larger than the predefined finger tap target size, and display each of the user interactive regions on the touch screen along with the specified user interactive region according to each scalable value associated therewith, wherein, receipt of the selection thereof by the user causes the specified, expandable user interactive region to undergo expansion to incrementally display the plurality of constituent selectively scaled user interactive regions in a second size-based hierarchy, in which larger regions thereof display included information more rapidly than smaller regions thereof during the expansion.

11. The computer program product of claim 10, wherein the instructions, when executed by the at least one processor, are further configured to selectively scale the size of each finger tap sensitive target according to a user tactile input via tactile gesture by the user.

12. The computer program product of claim 10, wherein the instructions, when executed by the at least one processor, are further configured to:
measure available display area of the display, and
partition the available display area into the plurality of user interactive regions.

13. The computer program product of claim 10, wherein each visualization context represents each corresponding scalable value as scale of the associated user interactive region.

14. A computer-implemented method, comprising:
displaying a plurality of user interactive regions having respective sizes on a touch screen adjacent to each other in a size-based hierarchy, each user interactive region including a finger tap sensitive target that is configured to receive an interactive finger tap by a user touching the finger tap sensitive target, the each user interactive region and the included finger tap sensitive target being associated with a respective scalable value, the respective scalable values representing a visualization context associated with the each user interactive region, the displaying including:
selectively scaling the size of each user interactive region and included finger tap sensitive target according to the respective scalable values associated therewith,
grouping, based on a determination that one or more of the selectively scaled user interactive regions are dimensionally smaller than a predefined finger tap target size on the touch screen, the one or more of the selectively scaled user interactive regions into a specified user interactive region on the touch screen that is larger than the predefined finger tap target size, the specified user interactive region being expandable in size, upon selection thereof by a user touching the finger tap sensitive target included in the specified user interactive region, to ungroup and display a plurality of constituent selectively scaled user interactive regions of the specified user interactive region at sizes larger than the predefined finger tap target size, and
displaying each of the user interactive regions on the touch screen along with the specified user interactive region according to each scalable value associated therewith,
wherein, receipt of the selection thereof by the user causes the specified, expandable user interactive region to undergo expansion to incrementally display the plurality of constituent selectively scaled user interactive regions in a second size-based hierarchy, in which larger regions thereof display included information more rapidly than smaller regions thereof during the expansion.

15. The method of claim 14, further comprising:
selectively scaling the size of each finger tap sensitive target according to a user tactile input via tactile gesture by the user.

16. The method of claim 14, further comprising:
measuring available display area of the display; and
partitioning the available display area into the plurality of user interactive regions.

17. The method of claim 14, wherein each visualization context represents each corresponding scalable value as scale of the associated user interactive region.

* * * * *